United States Patent [19]

Canat et al.

[11] Patent Number: 4,792,428

[45] Date of Patent: Dec. 20, 1988

[54] NUCLEAR FUEL ASSEMBLY WITH A FREE END GRID

[75] Inventors: Jean-Noël Canat, Lyons; Joël Pla, Villeurbanne, both of France

[73] Assignees: Framatome, Courbevoie; Compagnie Generale Des Matieres Nucleaires, Velizy-Villa Coublay, both of France

[21] Appl. No.: 90,054

[22] Filed: Aug. 27, 1987

[30] Foreign Application Priority Data

Aug. 28, 1986 [FR] France ................................ 86 12172

[51] Int. Cl.$^4$ ................................................ G21C 3/34
[52] U.S. Cl. ...................................... 376/440; 376/438
[58] Field of Search ............... 376/438, 440, 441, 442, 376/445, 451

[56] References Cited

U.S. PATENT DOCUMENTS

| 3,239,426 | 3/1966 | Waine | 376/440 |
| 3,954,560 | 5/1976 | Delafosse | 376/438 |
| 4,056,441 | 11/1977 | Marmonier | 376/438 |
| 4,599,213 | 7/1986 | Leclercq | 376/440 |

Primary Examiner—Donald P. Walsh
Attorney, Agent, or Firm—Pollock, Vande Sande & Priddy

[57] ABSTRACT

A nuclear fuel assembly comprising a plurality of fuel elements, a structure having an upper end piece and a lower end piece rigidly connected together by tie rods and a plurality of spacing grids. The plurality of spacing grids comprises two end grids, one being connected to the fuel elements and secured to the tie rods and the other being connected to the fuel elements and slidably received by the tie-rods, and a plurality of intermediate grids secured to the tie-rods and slidably received by the fuel elements. The bundle of fuel elements can extend and retract from the end grid which is secured to the tie rods while being maintained and supported by the structure.

6 Claims, 2 Drawing Sheets

NUCLEAR FUEL ASSEMBLY WITH A FREE END GRID

BACKGROUND OF THE INVENTION

The present invention relates to a fuel assembly for a nuclear reactor of the type comprising a framework or structure including two endpieces connected together by elongated elements or tie rods such as guide tubes, and several spacing grids comprising an upper end grid, a lower end grid and intermediate grids, said spacing grids forming cells for holding a bundle of fuel elements maintained at the nodal points of a square network. Each of said fuel elements is provided with a metal sheath closed at each of its ends by a fluid-tight plug arranged to engage the corresponding end grid.

The invention is particularly suitable, although not exclusively for pressurized water nuclear reactors, so-called PWRs, for which the intermediate grids disposed along the assembly are formed of zirconium-based alloy called "Zircalloy" having a low absorption cross-section for neutrons and weak mechanical characteristics under radiation.

In the above described type of fuel assemblies the spacing grids fulfill several functions. They ensure structral protection of the assembly against transverse shocks, they permit the mixing of the coolant streams and they support laterally and brace the fuel elements containing the fissile material.

Two types of spacing grids are possible, knowning that they must permit differential movements between the elongated elements of the assembly structure and the fuel elements. Either the grid is connected to the fuel elements, or the grid is connected to the elongated elements belonging to the structure or framework.

The document FR-A-No. 2 088 009 shows a rigid framework formed of two parallel end pieces, braced by tie-rods regularly distributed at the nodal points of a regular network. The diameter of the tie-rods is substantially equal to the diameter of the fuel rods. The spacing grids are slidably and not rigidly connected to the tie rods. The fuel elements being in greater number than the tie-rods, the spacing grids move with the fuel elements and, due to the expansion of the fuel elements which is different from the expansion or dilatation of the tie-rods during operation of the reactor, slide over the tie rods. The described assembly comprises abutment sleeves coaxial with the tie-rods between the different spacing grids for limiting their movements beyond predetermined limits. This type of assembly presents several drawbacks:

The upper grids sliding over the tie-rods can become too great if the fuel elements elongation reach consequent values; the guidance and support of the bundle of fuel elements risks then to be jeopardized and wear of the tie-rods will occur to much;

it is not possible to use "zircalloy" (of weak mechanical characteristics) as a material for the spacing grids in the mid-portion of the assembly;

the fuel elements rest on the assembly lower end piece which constitutes an abutment support for said fuel elements but in no case allows sufficient clamping for enabling axial support of the fuel elements.

SUMMARY OF THE INVENTION

It is an object of the present invention to provide an improved fuel assembly for a nuclear reactor; it is a more particular object of the invention to provide an assembly which permits to use for the intermediate grids disposed along the medium part of the assembly, an alloy having a low absorption cross section for neutrons whilst reducing notably the compressive force exerted on the fuel rods when the fuel rods are elongated due to temperature dilatation. Thus the level of deformation of the fuel rods and of the framework of the assembly is lowered.

For that purpose the invention provides a nuclear reactor having a vessel for containment of a coolant, a core in said vessel arranged to be traversed by said coolant and comprising a plurality of mutually adjacent upstanding nuclear fuel assemblies;

a nuclear fuel assembly comprising:

a bundle of a plurality of fuel elements, each having a metal sheath closed at its ends by end plugs consisting of an upper end plug and a lower end plug, a structure for maintaining and supporting said bundle of fuel elements in parallel relationship, said structure having an upper end piece and a lower end piece rigidly connected together by tie rods, and a plurality of spacing grids spaced apart along the tie rods and defining cells disposed at nodal points of a regular network for retaining said fuel element, said plurality of spacing grids comprising:

two end grids comprising an upper end grid and a lower end grid, one of said upper end grid and lower end grid being connected to the respective ones of the upper end plugs and lower end plugs of all said fuel elements and secured to the tie rods, and the other of said end grids being connected to the other of the end plugs of each fuel element and slidably received by said tie rods, and a plurality of intermediate grids secured to the tie rods and slidably received by the fuel elements, whereby the bundle of fuel elements can extend and retract from that one of said end grids which is secured to the tie rods whilst being maintained and supported by the structure.

The invention also provides a fuel assembly for a nuclear reactor wherein each cell for retaining the fuel elements of at least one of said upper end grid and lower end grid comprises resilient blade means and wherein each respective ones of the upper end plugs and lower end plugs of all said fuel elements is formed with a groove arranged to engage said resilient blade means.

The invention also provides a fuel assembly, wherein the resilient blade means comprise two resilient blades symmetrically disposed in the corresponding cell.

It is also an object of the invention to provide an assembly wherein at least one of the upper end grid and lower end grid is connected to the respective ones of the upper end plugs and lower end plugs of all said fuel elements by tightly fitting means, whereby differential expansion or retraction between said fuel elements may be possible.

Furthermore the invention provides an assembly presenting the following features:

The end grid secured to the plugs of one end of the fuel elements of the bundle and fast to the tie rods or elongated elements can be the lower or upper end grid, but will more advantageously be the lower end grid.

The intermediate grids may be constituted of zirconimum-based alloy called "Zircalloy", the end grid fixed to the tie rods being of an alloy with high mechanical characteristics containing iron, chromium and nickel such as those known under the name "Inconel".

The free end grid will be more advantageously formed of "Zircalloy" but may also be of "Inconel", or of both materials.

BRIEF DESCRIPTION OF THE DRAWINGS

The invention will be better understood from reading the following description of particular embodiments given by way of non-limiting example. The description refers to the accompanying drawings in which.

DETAILED DESCRIPTION OF PREFERRED EMBODIMENTS

Figure 1:
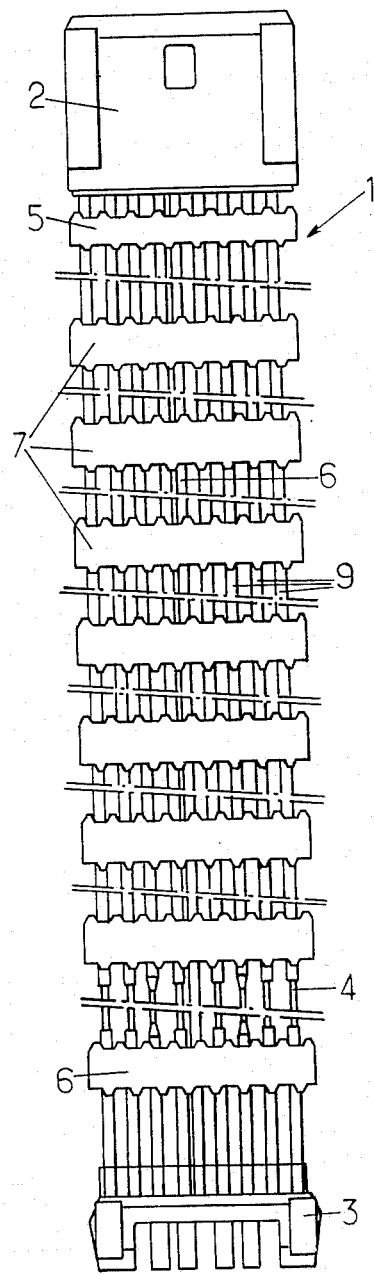
FIG. 1 is a partial front view of a fuel element according to the invention.
Figure 2:
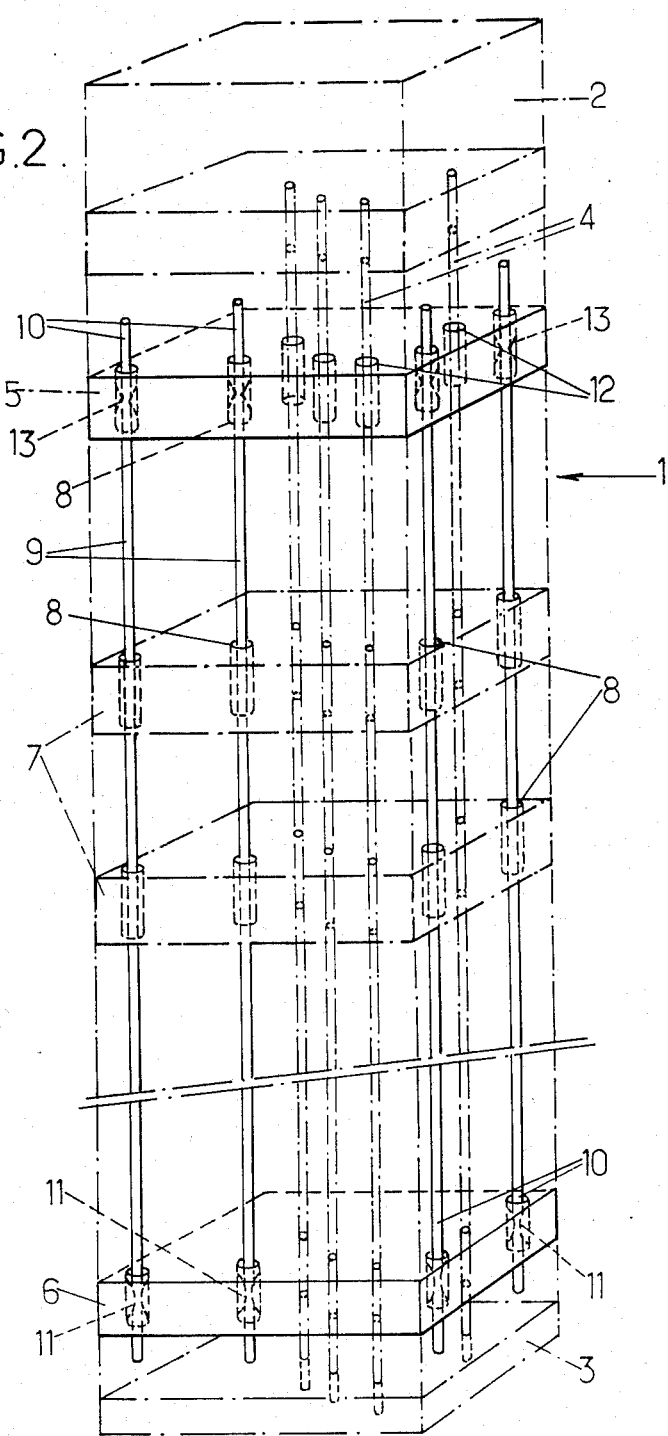
FIG. 2 shows a schematic isometric view of the assembly of FIG. 1.

FIGS. 1 and 2 show a fuel assembly 1 comprising a structure having an upper end piece 2 and a lower end piece connected by tie rods such as indicated in chain-dotted lines on FIG. 2. The assembly 1 comprises an upper end grid 5, a lower end grid 6, and intermediate grids 7. The grids form supporting cells 8 for fuel elements 9, at the nodal points of a regular network. For a pressurized light water reactor fuel assembly, the regular network adopted is generally a lattice of square pitch, 17×17 nodes. Each of the fuel elements 9 is provided with a metal sheath closed at its ends by an upper and a lower fluid-tight end plugs received by the end grids 5 and 6.

Each of the two upper and lower end grids is connected to the respective upper and lower end plugs of all the fuel elements. Referring to FIG. 2, one type of friction securing connection is shown due to local reduction 11 of the diameter of the suporting cell of the upper and lower end grids, but other types of connections are possible.

Referring to FIG. 2, the guide tubes 4 are fast to the end pieces 2 and 3, to the lower end grid 6 and to the intermediate grids 7. On the contrary, the upper end grid 5 is arranged to slide freely over the guide-tubes which are slidably received by cells 12 formed within said upper end grid.

The fuel elements 9 are connected to the lower end grid 6 and to the upper end grid 5. They are slidably received by cells 18 of the intermediate grids 7. The lower end grid 6, being fixed on the one hand, to the guide tubes, and, on the other hand, to the fuel elements 9, constitutes a fixed point for the fuel elements. The bundle of fuel elements being fixed to the upper end grid 5, itself adapted to slide freely along the guide-tubes of the structure, can extend and retract through the cells of the intermediate grids.

The fuel elements can be connected to one of the end grids by friction 13, so as to permit the differential expansion of the fuel elements with respect to one another. This friction enables a fuel element to move when the longitudinal differential stresses to which one or more elements are submitted, with regard to the rest of the fuel elements bundle, become too great and go above a predetermined value in spite of the overall movement of the upper end grid and the attached bundle of fuel elements.

It is self-evident that the same result can be obtained by reversing the roles played by the lower end and upper end grids.

By permitting the bundle of fuel elements to move globally from one fixed point during extension or retraction of the fuel rods and/or irradiation, no opposing force is generated at the ends, thus eliminating the phenomenon of global arching of the fuel rods whilst permitting good lateral support of the fuel rods in a zone where stresses due to the flow of the primary fluid of the reactor are important. The free end grid (upper end grid) hence permits to provide an improved assembly in which the stresses generated by the extension or retraction of the fuel elements, the stresses on the fuel elements themselves and on the structure of the assembly, are to a large extent eliminated, thus reducing the risk of overall arching of the assembly.

The structure of the assembly therefore does not particularly undergo deformation which could cause problems during the handling of the assembly after irradiation. The lower or upper fixed end grid is advantageously constituted of "Inconel", which material enables a sufficient gripping of the fissile fuel element to be guaranteed throughout the life of the fuel. The intermediate grids disposed along the assembly and the fixed end grid can be made of "Zircalloy", a material having a low absorption cross section for neutrons. The low mechanical characteristics under irradiaton of Zircalloy is not a problem since cross-bracing of the fuel elements is not required of intermediate grids and fixed end grid.

Figure 3:
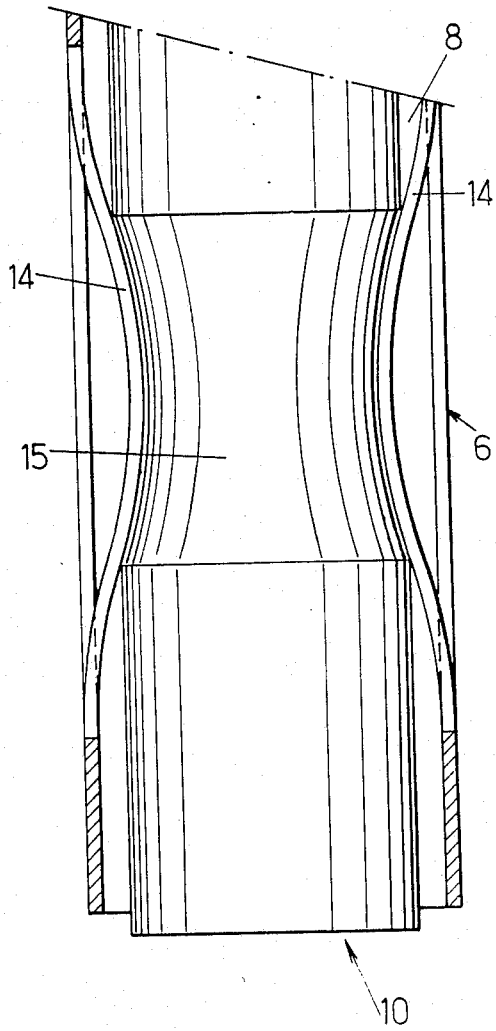
FIG. 3 is an enlarged partial view of an end plug secured to its corresponding end grid.

FIG. 3 shows a type of fixation, for example to a lower end grid 6, of an end plug 10 of a fuel element 9 belonging to an assembly according to the invention. The plug 10 passes through the grid 6 in the cell 8, which includes flexible blades 14, for instance consisting of adequate cuts of the intersecting blades constituting the grid in a manner known per se. A groove 15 is formed in the end plug. The flexible or resilient blades 14 engage the groove 15 and holds the fuel elements laterally and axially. Such blade means authorizes a sufficient support of the fuel elements so as to do not render necessary to use this blade means on both end grids. No relaxation effects are observed, contrary to those observed in known fuel element supporting means comprising a flexible or resilient blade or a spring fast to the grid and pressing the fuel element on to supports or bosses also provided on the grid.

During operation, the axial stiffness of the blades permits them to withstand axial stresses due to the weight, the Archimede pressure ans the hydraulic pressure. The forces exerted by the resilient blade adapts itself to the stresses. The counter pre-stress which is undertaken on the element can therefore be low, due to the gain on relaxation. The blade springs may be disposed on planes offset axially so as to ensure better embedding of the end plugs and to lessen the vibrations of the fuel elements.

We claim:

1. In a nuclear reactor having a vessel for containment of a coolant, a core in said vessel arranged to be traversed by said coolant and comprising a plurality of mutually adjacent upstanding nuclear fuel assemblies,
   a nuclear fuel assembly comprising:
   a bundle of a plurality of fuel elements, each having a metal sheath closed at its ends by end plugs consisting of an upper end plug and a lower end plug,
   a structure for maintaining and supporting said bundle of fuel elements in parallel relationship, said structure having an upper end piece and a lower end piece rigidly connected together by tie rods,and a plurality of spacing grids spaced apart along the tie rods and defining cells disposed at nodal points of a regular network for retaining said fuel elements, said plurality of spacing grids comprising:

two end grids comprising an upper end grid and a lower end grid, one of said upper end grid and lower end grid being connected to the respective ones of the upper end plugs and lower end plugs of all said fuel elements and secured to the tie rods, and the other of said end grids being connected to the other of the end plugs of each fuel element and slidably received by said tie rods, and a plurality of intermediate grids secured to the tie rods and slidably received by the fuel elements, whereby the bundle of fuel elements can extend and retract from that one of said end grid which is secured to the tie rods whilst being maintained and supported by the structure.

2. The assembly according to claim 1, wherein each cell for retaining the fuel elements of at least one of said upper end grid and lower end grid comprise resilient blade means and wherein each repective ones of the upper end plugs and lower end plugs of all said fuel elements is formed with a groove arranged to engage said resilient blade means.

3. The assembly according to claim 1, wherein at least one of the upper end grid and lower end grid is connected to the respective ones of the upper end plugs and lower end plugs of all said fuel elements by tightly fitting means, whereby differential expansion or retraction between said fuel elements is possible when differential stresses exerted on said fuel elements go above a predetermined value.

4. The assembly according to claim 2, wherein the resilient blade means of a cell comprise two resilient blades symmetrically disposed in said cell.

5. The assembly according to claim 1, wherein the lower end grid is connected to the lower end plugs of all fuel elements and is secured to the tie rods.

6. The assembly according to claim 1, wherein the intermediate grids and the one of the upper end grid and lower end grid slidably received by the tie rods are in a zirconium base alloy, such as Zircalloy, and the other one of the upper end grid and lower end grid secured to the tie rods is in Inconel.

* * * * *